(12) United States Patent
Chen et al.

(10) Patent No.: US 10,047,011 B2
(45) Date of Patent: Aug. 14, 2018

(54) CERAMIC AND METHOD FOR PREPARING THE SAME

(71) Applicant: BYD COMPANY LIMITED, Shenzhen, Guangdong (CN)

(72) Inventors: Ge Chen, Shenzhen (CN); Yongzhao Lin, Shenzhen (CN); Xinping Lin, Shenzhen (CN)

(73) Assignee: BYD Company Limited, Shenzhen, Guangdong, P.R. (CN)

( * ) Notice: Subject to any disclaimer, the term of this patent is extended or adjusted under 35 U.S.C. 154(b) by 0 days.

(21) Appl. No.: 15/192,721

(22) Filed: Jun. 24, 2016

(65) Prior Publication Data

US 2016/0304404 A1   Oct. 20, 2016

Related U.S. Application Data

(63) Continuation of application No. PCT/CN2014/095131, filed on Dec. 26, 2014.

(30) Foreign Application Priority Data

Dec. 30, 2013  (CN) .......................... 2013 1 0745369

(51) Int. Cl.
| | |
|---|---|
| *C04B 35/117* | (2006.01) |
| *C04B 35/626* | (2006.01) |
| *C04B 35/634* | (2006.01) |
| *C04B 35/636* | (2006.01) |
| *C04B 35/645* | (2006.01) |
| *C04B 35/111* | (2006.01) |

(52) U.S. Cl.
CPC .......... *C04B 35/117* (2013.01); *C04B 35/111* (2013.01); *C04B 35/62685* (2013.01); *C04B 35/634* (2013.01); *C04B 35/6365* (2013.01); *C04B 35/63416* (2013.01); *C04B 35/645* (2013.01); *C04B 2235/3206* (2013.01); *C04B 2235/3213* (2013.01); *C04B 2235/3217* (2013.01); *C04B 2235/3251* (2013.01); *C04B 2235/3255* (2013.01); *C04B 2235/3262* (2013.01); *C04B 2235/3268* (2013.01); *C04B 2235/3274* (2013.01); *C04B 2235/3275* (2013.01); *C04B 2235/3418* (2013.01); *C04B 2235/443* (2013.01); *C04B 2235/604* (2013.01); *C04B 2235/6562* (2013.01); *C04B 2235/6567* (2013.01); *C04B 2235/661* (2013.01); *C04B 2235/74* (2013.01); *C04B 2235/768* (2013.01); *C04B 2235/80* (2013.01); *C04B 2235/96* (2013.01); *C04B 2235/9661* (2013.01)

(58) Field of Classification Search
CPC .... C04B 2235/3262; C04B 2235/3268; C04B 35/016
See application file for complete search history.

(56) References Cited

FOREIGN PATENT DOCUMENTS

| | | |
|---|---|---|
| CN | 102093039 A | 6/2011 |
| CN | 102795841 A | 11/2012 |
| WO | WO 2015/101224 A1 | 7/2015 |

OTHER PUBLICATIONS

Wu et al. Dielectric Properties of Al2O3-Doped Barium Strontium Titanate for Application in Phased Array Antennas. Jpn. J. Appl. Phys. vol. 38 (1999) pp. 5154-5161.*
PCT International Search Report and Written Opinion dated Mar. 30, 2015, issued in corresponding International Application No. PCT/CN2014/095131 (13 pages).
Julia Y. Chan et al., "Subsolidus phase relations and dielectric properties in the SrO—Al$_2$O$_3$—Nb$_2$O$_5$ system", *International Journal of Inorganic Materials*, vol. 2 (2000), pp. 107-114.
J.-C. Grivel, "Subsolidus phase relations of the SrO—Ta$_2$O$_5$—CuO system at 900° C. in air", *Journal of Alloy and Compounds*, vol. 486 (2009), pp. 293-298.
V.V. Lennikov et al., "In situ synthesis of composite MTiO$_3$—Al$_2$O$_3$ coatings via laser zone melting", *Solid State Sciences*, vol. 9 (2007), pp. 404-409.
M. Sales et al., "The Phase Diagram CaO—Al$_2$O$_3$—Ta$_2$O$_5$ and the Crystal Structures of Ca$_2$AlTaO$_6$ and CaAlTaO$_5$", *Journal of Solid State Chemistry*, vol. 143 (1999), pp. 62-68.
Jian-feng Tong et al., "Microstructure and Preparation of Al$_2$O$_3$/Ba$_x$Sr$_{1-x}$TiO$_3$ Ceramic by Gel-Casting", *Vacuum Electronics*, No. 4, Aug. 31, 2015, pp. 28-31.
T.A. Vanderah et al., "Phase Equilibria and Dielectric Behavior in the CaO:Al$_2$O$_3$:Nb$_2$O$_5$ System", *Journal of Solid State Chemistry*, vol. 155 (2000), pp. 78-85.
G. Wroblewska, "Effect of Titanate Additions on Sintering Temperature of Al2O3", *Ceramurgia International*, vol. 5, No. 3 (1979), pp. 120-123.
Guo Zhang et al., "Effect of La—Sr modifiers and sol—gel method assistant by polyethylene glycol on the thermal stability of alumina", *Journal of Harbin Institute of Technology*, vol. 38, No. 3, Mar. 2006, pp. 456-459.

* cited by examiner

*Primary Examiner* — Noah S Wiese
(74) *Attorney, Agent, or Firm* — Finnegan, Henderson, Farabow, Garrett & Dunner LLP

(57) ABSTRACT

A ceramic and a method for preparing a ceramic are provided. The ceramic includes an alumina and an oxygen-containing compound of strontium having a perovskite structure.

6 Claims, No Drawings

CERAMIC AND METHOD FOR PREPARING THE SAME

CROSS-REFERENCE TO RELATED APPLICATION

This application is a continuation of International Application No. PCT/CN2014/095131, filed on Dec. 26, 2014, which claims priority to and benefits of Chinese Patent Application No. 201310745369.0, filed with the State Intellectual Property Office of P.R.C. on Dec. 30, 2013, the entire contents of these applications are incorporated herein by reference.

FIELD

Exemplary embodiments of the present disclosure relate generally to a ceramic field, and more particularly to a ceramic and a method of preparing a ceramic.

BACKGROUND

Alumina has some outstanding advantages such as good corrosion resistance, so that it has been widely developed and applied. But the toughness of a conventional alumina ceramic may be relatively poor.

In the related art, zirconium oxide was added into the alumina ceramic so as to improve the toughness of the alumina ceramic, and by adding zirconium oxide, the toughness may reach a range of 5 MPam$^{1/2}$ to 6 MPam$^{1/2}$. Chinese patent application CN02111742 discloses a zirconia toughened alumina (ZTA) ceramic, which contains 60 wt % of zirconium oxide whose content is even larger than that of alumina, thus that the outstanding advantages of alumina itself maybe disappeared. In this condition, the cost of the alumina ceramic may be increased and alumina specific properties may be influenced or even disappear.

SUMMARY

Embodiments of the present disclosure seek to solve at least one of the problems.

According to a first aspect of the present disclosure, a ceramic is provided. The ceramic includes an alumina and an oxygen-containing compound of strontium having a perovskite structure.

The inventors of the present disclosure have found that, the ceramic containing alumina and the oxygen-containing compound of strontium having a perovskite structure may have relatively larger toughness and break resistance. In some embodiments of the present disclosure, during a sintering process of the ceramic, and at least one of the flexibilizer and the black stain may react with the additive to form an oxygen-containing compound of strontium having a perovskite structure, thus improving toughness, blackness, and break resistance of the ceramic.

According to a second aspect of the present disclosure, a method of preparing a ceramic is provided. The method of preparing a ceramic includes: providing a first uniform slurry of a basis material, an additive, a flexibilizer, a black stain and a sintering aid in an organic solvent; providing a second uniform slurry of the first slurry and a binder; drying the second slurry to form a spherical powder; and dry pressing and sintering the spherical powder to form the ceramic, in which the basis material contains alumina, the additive contains strontium carbonate, and an oxygen-containing compound of strontium having a perovskite structure is obtainable by a reaction of the additive with at least one of the flexibilizer and the black stain during the sintering process.

In some embodiments of the present disclosure, the step of sintering includes heating under the following temperature conditions: increasing the temperature from room temperature to 600° C. in 400 minutes, and maintaining at 600° C. for 120 minutes; increasing the temperature from 600° C. to 1150° C. in 300 minutes and maintaining at 1150° C. for 120 minutes; increasing the temperature from 1150° C. to 1300° C. in 150 minutes and maintaining at 1300° C. for 120 minutes; increasing the temperature from 1300° C. to 1350° C. in 50 minutes and maintaining at 1350° C. for 120 minutes; and reducing the temperature from 1350° C. to 900° C. in 150 minutes.

According to a third aspect of the present disclosure, a ceramic prepared by the method mentioned above is provided.

In some embodiments of the present disclosure, the toughness and the break resistance of the ceramic prepared by the above described method may be improved, for example, the toughness of the ceramic may reach a range from 6 MPa m$^{1/2}$ to 8 MPa m$^{1/2}$. In addition, the blackness of the ceramic may be improved, for example, a red-green value (a) of the ceramic may range from 0.06 to 0.07, a blue-yellow value (b) of the ceramic may range from −0.032 to −0.02, an intensity of light reflected from a surface of the ceramic (L) may range from 43 to 44. The ceramic prepared by the method according to embodiments of the present disclosure may have a blackness higher than that of a conventional ceramic having a red-green value (a) of 0.08, a blue-yellow value (b) of −0.04, and an intensity of light reflected from a surface thereof (L) of 44.

Additional aspects and advantages of embodiments of present disclosure will be given in part in the following descriptions, become apparent in part from the following descriptions, or be learned from the practice of the embodiments of the present disclosure.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

According to a first aspect of the present disclosure, a ceramic is provided. The ceramic includes an alumina and an oxygen-containing compound of strontium having a perovskite structure.

In some embodiments of the present disclosure, the oxygen-containing compound of strontium contains $Sr_aA_bO_c$ and $Sr_xE_yO_z$, where: A is tantalum or niobium; E is at least one element selected from the group consisting of Co, Fe and Mn. In other words, the oxygen-containing compound of strontium includes $Sr_aTa_bO_c$ and/or $Sr_aNb_bO_c$, and contains at least one selected from the group consisting of $Sr_xCo_yO_z$, $Sr_xFe_yO_z$ and $Sr_xMn_yO_z$. With the above identified compounds, the toughness and the blackness of the ceramic may be improved.

In some embodiments of the present disclosure, a, b, c, x, y and z satisfy: a ranges from 1.5 to 2.5, b ranges from 1.5 to 2.5, c ranges from 6.5 to 7.5, x ranges from 0.9 to 1.1, y ranges from 0.9 to 1.1, and z ranges from 2.7 to 3.3.

Those skilled in the art will understand that, alumina may be the basis material in the ceramic. In some embodiments of the present disclosure, based on the total weight of the ceramic, an amount of the alumina may be in a range of 97 wt % to 99.8 wt %, and an amount of the oxygen-containing compound of strontium having a perovskite structure may be in a range of 0.2 wt % to 0.4 wt %.

According to a second aspect of the present disclosure, a method of preparing a ceramic is provided. The method includes: providing a first uniform slurry of a basis material, an additive, a flexibilizer, a black stain and a sintering aid in an organic solvent; providing a second uniform slurry of the first slurry and a binder; drying the second slurry to form a spherical powder; and dry pressing and sintering the spherical powder to form the ceramic, in which the basis material contains alumina, the additive contains strontium carbonate, and an oxygen-containing compound of strontium having a perovskite structure is obtainable by a reaction of the additive with at least one of the flexibilizer and the black stain during the sintering process.

In some embodiments, during the process of providing the first uniform slurry, the sintering aid and a ceramic raw material consisting of the basis material, the additive, the flexibilizer and the black stain are mixed uniformly in the organic solvent.

In some embodiments, during the process of providing the second uniform slurry, the binder is added into the first uniform slurry and mixed uniformly with the first uniform slurry.

In some embodiments of the present disclosure, the additive may further contain calcium carbonate and/or lanthanum carbonate.

In some embodiments of the present disclosure, the step of sintering is performed by heating under the following temperature conditions: increasing the temperature from room temperature to 600° C. in 400 minutes, and maintaining at 600° C. for 120 minutes; increasing the temperature from 600° C. to 1150° C. in 300 minutes and maintaining at 1150° C. for 120 minutes; increasing the temperature from 1150° C. to 1300° C. in 150 minutes and maintaining at 1300° C. for 120 minutes; increasing the temperature from 1300° C. to 1350° C. in 50 minutes and maintaining at 1350° C. for 120 minutes; and reducing the temperature from 1350° C. to 900° C. in 150 minutes.

By using the above mentioned sintering step, the perovskite structure of the oxygen-containing compound of strontium obtainable by a reaction of the additive with at least one of the flexibilizer and the black stain may be more stable, thus being more convenient for thoghening and staining.

In addition of naturally cooling to room temperature (20±5° C.), in the step of increasing the temperature and reducing the temperature, there is no special limit to the temperature increasing speed and temperature decreasing speed, in which both uniform speed and non-uniform speed may be adopted. For the sake of easier operating, uniform temperature increasing speed or uniform temperature decreasing speed may be used in the present disclosure.

In some embodiments of the present disclosure, in order to realize a good performance of the basis material, based on 100 weight parts of the basis material, an amount of the additive ranges from 1 weight part to 4 weight parts, an amount of the flexibilizer ranges from 0.2 weight parts to 3 weight parts, an amount of the black stain ranges from 0.5 weight parts to 5 weight parts, an amount of the sintering aids ranges from 0.2 weight parts to 0.5 weight parts, and an amount of the binder ranges from 0.4 weight parts to 0.6 weight parts.

In some embodiments of the present disclosure, the flexbilizer may be any conventional flexbilizer used for ceramic, which is known to those skilled in the art. In order to improve the toughness of the ceramic, to form a more stable perovskite structure with strontium carbonate, to prevent cracks from extending, the flexbilizer may be tantalum pentoxide and/or niobium pentoxide. In an embodiment, the flexbilizer may be tantalum pentoxide.

In some embodiments of the present disclosure, the black stain may be any conventional black stain known to those skilled in the art, and the black stain may include manganese carbonate and/or a mixture of cobalt carbonate and iron carbonate. With the above-identified components, the black stain may form a more stable perovskite structure with the additive such as strontium carbonate, thus further improving the blackness of the ceramic.

With the above mentioned components and amounts, the prepared ceramic may comprise an oxygen-containing compound of strontium having a perovskite structure. In some embodiments of the present disclosure, the oxygen-containing compound of strontium includes a compound represented by $Sr_aA_bO_c$ and a compound represented by $Sr_xE_yO_z$, where A is tantalum or niobium; E is at least one selected from the group consisting of Co, Fe and Mn.

In some embodiments of the present disclosure, the sintering aid may be any conventional sintering aids known to those skilled in the art, such as silicon dioxide and/or titanium dioxide. In some embodiments, the sintering aid may be silicon dioxide.

In some embodiments of the present disclosure, the binder may contain or consist of polyvinyl alcohol (PVA) and/or polyethylene glycol 4000 (PEG 4000). In some embodiments, the binder may consist of PVA and PEG 4000. In some embodiments, a molar ratio of PVA to PEG 4000 is in a range from 1:1 to 1:2. Therefore, various different components of the ceramic may be adhered more uniformly.

In some embodiments of the present disclosure, there are no special limits to the type and content of the organic solvent, and the organic solvent may be at least one of ethyl alcohol and acetone. In some embodiments, based on 100 weight parts of the basis material, an amount of the organic solvent may be in a range from 50 weight parts to 80 weight parts.

In some embodiments of the present disclosure, there are no special limits to the step of mixing, provided the mixing results in a uniform product. For example, the step of mixing may include ball-milling for about 4 hours to 8 hours. In some embodiments of the present disclosure, the ball-milling may be performed in a ball-milling pot.

In some embodiments of the present disclosure, the method of preparing a ceramic further includes a step of adding a dispersant into the first uniform slurry before providing the second uniform slurry. With the dispersant, the basis material, the additive, the flexibilizer, and the black stain may be mixed sufficiently, thus facilitating the following step of forming the perovskite structure. In addition, the interior structure, the color and the appearance of the prepared ceramic may be uniform, and the toughness of all parts of the ceramic may be uniform and consistent.

In some embodiments of the present disclosure, there are no special limits to the type and amount of the dispersant. For example, the dispersant may be at least one selected from the group consisting of hydroxypropyl methylcellulose (HPMC), sodium carboxymethylcellulose (CMC-Na) and triethanolamine (TEA). In some embodiments, based on 100 weight parts of the basis material, an amount of the dispersant may be 1 weight part to 2 weight parts.

In some embodiments of the present disclosure, the step of drying may be performed by any conventional drying method known to those skilled in the prior art, and during the drying step, the organic solvent in the second uniform slurry may be removed. In some embodiments of the present disclosure, the second uniform slurry may be spray dried to form the spherical powder. With the spray drying, the spherical powder may have a strong flowability, which may be easy for the subsequent dry pressing step. In some embodiments, the spray drying is performed in a spray column.

In some embodiments of the present disclosure, the dry pressing may be known to those skilled in the art. For example, the dry pressing may be performed under the following conditions: a presser with a loading tonnage of 180 tons and under an oil pressure of 6 MPa.

In some embodiments of the present disclosure, the method of preparing a ceramic may further includes polishing the ceramic to provide the ceramic with a shining appearance.

According to a third aspect of the present disclosure, a ceramic prepared by the above mentioned method is provided.

In some embodiments of the present disclosure, the ceramic may have an increased toughness and break resistance, for example, the toughness of the ceramic may reach 6 MPa m$^{1/2}$ to 8 MPa m$^{1/2}$, and the break resistant time of the ceramic measured with the following break resistant test may reach 10 to 15. In addition, the blackness of the ceramic may also be improved, for example, as compared with a standard ceramic sample with a red-green value of 0.08, a blue-yellow value of –0.04 and an intensity of light reflected from a surface thereof of 44, the prepared ceramic of the present disclosure may have a red-green value of 0.06 to 0.07, a blue-yellow value of –0.032 to –0.02, and an intensity of light reflected from a surface thereof of 43 to 44.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

Some illustrative and non-limiting examples are provided hereunder for a better understanding of the present invention and for its practical embodiment.

Related Material

In the following Embodiments and Comparative Embodiments, alumina, zirconia, manganese oxide, strontium carbonate, manganese carbonate, tantalum pentoxide and silicon dioxide were commercially available from Shanghai Dian Yang Industry Co., Ltd, Shanghai, China.

A standard sample (having a red-green value (a) of 0.08, a blue-yellow value (b) of –0.04 and an intensity of light reflected from a surface thereof (L) of 44) used in the blackness test was commercially from Kyocera Company, China.

Tests

Blackness was measured by using a SP64 spectrophotometer commercially available from X-Rite Color Management Co., Ltd., US. The results are shown in Table 2.

Composition and structure of the oxygen-containing compound of strontium in the ceramic were tested according to XRD phase analyzing method.

Toughness was measured according to GBT23806. The results are shown in Table 1.

Break resistance was measured with the following steps. 10 testing samples were dropped freely from a height having a distance of 1.5 m from the ground in such a manner that a surface of the testing sample having a size of 46 mm×46 mm was contacted with the ground when the testing sample reached the ground. The dropping process was repeated, until all the testing samples were broken. The dropping times of each testing sample were recorded, and the break resistant time was calculated as an average of the dropping times of the 10 testing samples.

Embodiment 1

The present embodiment E1 provides a ceramic and a method of preparing the ceramic.

Following materials were provided: a mixture of 200 g alumina, 2 g strontium carbonate, 1 g manganese carbonate and 0.4 g tantalum pentoxide (raw materials of a ceramic); 0.4 g silicon dioxide (sintering aid); 0.8 g mixture of PEG4000 and PVA with a weight ratio of 1:1 (binder); 2 g HPMC (dispersant); and 100 mL ethyl alcohol (organic solvent).

The above raw materials of a ceramic and the 0.4 g silicon dioxide were ball-milled together with 100 mL ethyl alcohol for 4 hours to form a first uniform slurry, 2 g dispersant and 0.8 g binder were added into the first uniform slurry, and then ball-milled for half an hour to form a second uniform slurry. The second uniform slurry was spray dried in a spray tower to form a spherical powder, and then the spherical powder was dry pressed with a presser having a loading tonnage of 180 tons under an oil pressure of 6 MPa, and sintered in the following sintering step to form a ceramic.

After the above tests, it was determined that the ceramic includes oxygen-containing compounds of strontium having a perovskite structure, i.e. $Sr_{1.5}Ta_{1.5}O_{6.5}$ and $Sr_{0.9}Mn_{0.9}O_{2.7}$. The ceramic was processed into sample plates A1 each with a size of 46 mm×46 mm×1.5 mm.

The sintering step was performed under the following temperature conditions: the temperature was increased uniformly from room temperature (20±5° C.) to 600° C. in 400 minutes and maintained at 600° C. for 120 minutes; the temperature was increased uniformly from 600° C. to 1150° C. in 300 minutes and maintained at 1150° C. for 120 minutes; the temperature was increased uniformly from 1150° C. to 1300° C. in 150 minutes and maintained at 1300° C. for 120 minutes; the temperature was increased uniformly from 1300° C. to 1350° C. and maintained at 1350° C. for 120 minutes; and the temperature was reduced uniformly from 1350° C. to 900° C. in 150 minutes.

Embodiment 2

The present embodiment E2 provides a ceramic and a method of preparing the ceramic.

Following materials were provided: a mixture of 200 g alumina, 6 g strontium carbonate, 4 g manganese carbonate and 2.6 g tantalum pentoxide (raw materials of a ceramic); 0.6 g silicon dioxide (sintering aid), 1 g mixture of PEG4000 and PVA with a weight ratio of 1:1.5 (binder); 3 g CMC-Na (dispersant); and 120 mL ethyl alcohol (organic solvent).

The above raw materials of a ceramic and the 0.6 g silicon dioxide were ball-milled with 120 mL ethyl alcohol for 6 hours to form a first uniform slurry, and 3 g dispersant and 1 g binder were added into the first uniform slurry, and then ball-milled for half an hour to form a second uniform slurry.

The second uniform slurry was spray dried in a spray tower to form a spherical powder, and then the spherical powder was pressed with a presser having a loading tonnage of 180 tons under an oil pressure of 6 MPa, and sintered in the following sintering step to form a ceramic. Then the ceramic was polished.

After the above tests, it was determined that the ceramic includes oxygen-containing compounds of strontium having a perovskite structure, i.e. $Sr_{1.8}Ta_{1.8}O_7$ and $SrMnO_3$. Then the ceramic was processed into sample plates A2 each with a size of 46 mm×46 mm×1.5 mm.

The sintering step was performed under the following temperature conditions: the temperature was increased from room temperature (20±5° C.) to 600° C. in 400 minutes and maintained at 600° C. for 120 minutes; the temperature was increased from 600° C. to 1150° C. in 300 minutes and maintained at 1150° C. for 120 minutes; the temperature was increased from 1150° C. to 1300° C. in 150 minutes and maintained at 1300° C. for 120 minutes; the temperature was increased from 1300° C. to 1350° C. in 50 minutes and maintained at 1350° C. for 120 minutes; and the temperature was reduced from 1350° C. to 900° C. in 150 minutes, then naturally reduced to room temperature (20±5° C.).

Embodiment 3

The present embodiment E3 provides a ceramic and a method of preparing the ceramic.

Following materials were provided: a mixture of 200 g alumina, 8 g strontium carbonate, 10 g manganese carbonate and 6 g tantalum pentoxide (raw materials of a ceramic); 1 g silicon dioxide (sintering aid), 1.2 g mixture of PEG4000 and PVA with a weight ratio of 1:2 (binder); 4 g TEA (dispersant); and 160 mL ethyl alcohol (organic solvent).

The above raw materials of a ceramic and the 1 g silicon dioxide were ball-milled with 160 mL ethyl alcohol for 8 hours to form a first uniform slurry, and 4 g dispersant and 1.2 g binder were added into the first uniform slurry, then ball-milled for half an hour to form a second uniform slurry. The second uniform slurry was spray dried in a spray tower to form a spherical powder, then the spherical powder was dry pressed with a presser having a loading tonnage of 180 tons under an oil pressure of 6 MPa, and sintered in the following sintering step to form a ceramic. Then the ceramic was polished.

After the above tests, it was determined the ceramic includes oxygen-containing compounds of strontium having a perovskite structure, i.e. $Sr_{2.5}Ta_{2.5}O_{7.5}$ and $Sr_{1.1}Mn_{1.1}O_{3.3}$. Then the ceramic was processed into sample plates A3 each with a size of 46 mm×46 mm×1.5 mm.

The sintering step was performed under the following temperature conditions: the temperature was increased from room temperature (20±5° C.) to 600° C. in 400 minutes and maintained at 600° C. for 120 minutes; the temperature was increased from 600° C. to 1150° C. in 300 minutes and maintained at 1150° C. for 120 minutes; the temperature was increased from 1150° C. to 1300° C. in 150 minutes and maintained at 1300° C. for 120 minutes; the temperature was increased from 1300° C. to 1350° C. in 50 minutes and maintained at 1350° C. for 120 minutes; and the temperature was from 1350° C. reduced to 900° C. in 150 minutes, then naturally reduced to room temperature (20±5° C.).

Embodiment 4

The present embodiment E4 provides a ceramic and a method of preparing the ceramic.

The method for preparing the ceramic was substantially the same with that in Embodiment 1, with the following exceptions.

The sintering step was performed under the following temperature conditions: the temperature was increased from room temperature (20±5° C.) to 300° C. in 400 minutes and maintained at 300° C. for 120 minutes; the temperature was increased from 300° C. to 850° C. in 300 minutes and maintained at 850° C. for 120 minutes; the temperature was increased from 850° C. to 1200° C. in 150 minutes and maintained at 120° C. for 120 minutes; the temperature was increased from 1200° C. to 1350° C. in 50 minutes and maintained at 1350° C. for 120 minutes; and the temperature was reduced from 1350° C. to 900° C. in 50 minutes, then naturally reduced to room temperature (20±5° C.).

After the above tests, it was determined the ceramic includes oxygen-containing compounds of strontium having a perovskite structure, i.e. $SrTaO_5$ and $Sr_{0.8}Mn_{0.8}O_2$. The ceramic was processed into sample plates A4 each with a size of 46 mm×46 mm×1.5 mm.

Embodiment 5

The present embodiment E5 provides a ceramic and a method of preparing the ceramic.

The method for preparing the ceramic was substantially the same with that in Embodiment 1, with the following exceptions.

Following materials were provided: a mixture of 200 g alumina, 0.9 g strontium carbonate, 0.9 g manganese carbonate and 0.36 g tantalum pentoxide (raw materials of a ceramic); 0.2 g silicon dioxide (sintering aid); 1.6 g mixture of PEG4000 and PVA with a weight ratio of 1:1 (binder); and ethyl alcohol (organic solvent).

After the above tests, it was determined the ceramic includes oxygen-containing compounds of strontium having a perovskite structure, i.e. $Sr_3Ta_3O_8$ and $Sr_2Mn_{28}O_5$. The ceramic was processed into sample plates A5 each with a size of 46 mm×46 mm×1.5 mm.

Comparative Embodiment 1

The present comparative embodiment CE 1 provides a ceramic and a method of preparing the ceramic.

The method for preparing the ceramic was substantially the same with that in Embodiment 1, with the following exceptions.

Same weight of zirconium oxide was used instead of the strontium carbonate, the manganese carbonate and the tantalum pentoxide, i.e. 2.16 g zirconium oxide was used instead of the 0.9 g strontium carbonate, 0.9 g manganese carbonate and 0.36 g tantalum pentoxide.

The ceramic was processed into sample plates CA1 each with a size of 46 mm×46 mm×1.5 mm.

TABLE 1

| Sample plate | Toughness (MPa m$^{1/2}$) | Break resistance time |
|---|---|---|
| A1 | 8 | 15 |
| A2 | 7 | 12 |
| A3 | 8 | 15 |
| A4 | 6 | 10 |
| A5 | 7 | 11 |
| CA1 | 5 | 2 |

TABLE 2

| Sample plate | L | a | b |
|---|---|---|---|
| Standard sample | 44 | 0.08 | −0.04 |
| A1 | 43 | 0.06 | −0.03 |
| A2 | 43 | 0.06 | −0.03 |
| A3 | 44 | 0.07 | −0.02 |
| A4 | 43 | 0.07 | −0.032 |
| A5 | 43 | 0.07 | −0.032 |
| CA1 | Brown when observed with the naked eye | | |

L: intensity of light reflected from a surface of the ceramic.
a: red-green value, if positive, it represents reddish; if negative, it represents greenish.
b: blue-yellow value, if positive, it represents yellowish; if negative, it represents blueish.

Comparing Embodiments 1-5 with Comparative Embodiment 1, it can be seen that, the ceramic of embodiments of the present disclosure may have a good toughness, a high blackness and high break resistance.

In addition, comparing Embodiment 1 with Embodiment 4, it can be seen that, with the sintering step described in Embodiment 1 (for example, the temperature was increased uniformly from room temperature to 600° C. in 400 minutes and maintained at 600° C. for 120 minutes; the temperature was increased uniformly from 600° C. to 1150° C. in 300 minutes and maintained at 1150° C. for 120 minutes; the temperature was increased uniformly from 1150° C. to 1300° C. in 150 minutes and maintained at 1300° C. for 120 minutes; the temperature was increased uniformly from 1300° C. to 1350° C. and maintained at 1350° C. for 120 minutes; and the temperature was reduced uniformly from 1350° C. to 900° C. in 150 minutes), the toughness and blackness of the ceramic may be further improved.

In addition, comparing Embodiment 1 with Embodiment 5, it can be seen that, with the components and amounts provided in Embodiment 1 (for example, based on 100 weight parts of the basis material, an amount of the additive ranges from 1 weight part to 4 weight parts, an amount of the flexibilizer ranges from 0.2 weight parts to 3 weight parts, an amount of the black stain ranges from 0.5 weight parts to 5 weight parts, an amount of the sintering aid ranges from 0.2 weight parts to 0.5 weight parts, and an amount of the binder ranges from 0.4 weight parts to 0.6 weight parts), the toughness and blackness of the ceramic may be further improved.

According to some embodiments of the present disclosure, the toughness and the break resistance of the ceramic prepared by the above method may be improved, for example, the toughness of the ceramic may reach a range from 6 MPa m$^{1/2}$ to 8 MPa m$^{1/2}$. In addition, the blackness of the ceramic may be improved, for example, a red-green value (a) of the ceramic may range from 0.06 to 0.07, a blue-yellow value (b) of the ceramic may range from −0.032 to −0.02, an intensity of light reflected from a surface of the ceramic (L) may range from 43 to 44. The ceramic prepared by the method according to embodiments of the present disclosure may have a blackness higher than that of a conventional ceramic having a red-green value (a) of 0.08, a blue-yellow value (b) of −0.04 and an intensity of light reflected from a surface thereof (L) of 44.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A ceramic comprising an alumina and an oxygen-containing compound of strontium having a perovskite structure,
   wherein the oxygen-containing compound of strontium comprises at least one of $Sr_aA_bO_c$ and $Sr_xE_yO_z$, where A represents at least one of tantalum and niobium; E represents at least one selected from a group consisting of cobalt, iron and manganese.

2. The ceramic of claim 1, wherein a ranges from 1.5 to 2.5, b ranges from 1.5 to 2.5, c ranges from 6.5 to 7.5, y ranges from 0.9 to 1.1, and z ranges from 2.7 to 3.3.

3. The ceramic of claim 1, wherein a red-green value of the ceramic ranges from 0.06 to 0.07, and a blue-yellow value ranges from 0.032 to −0.02.

4. The ceramic of claim 1, wherein a luminosity value L of the ceramic ranges from 43 to 44.

5. The ceramic of claim 1, wherein a toughness of the ceramic is in a range of 6 MPa m½ to 8 MPa m½.

6. A ceramic comprising an alumina and an oxygen-containing compound of strontium having a perovskite structure that is obtained by the method comprising:
   providing a first uniform slurry of a basis material, an additive, a flexibilizer, a black stain and a sintering aid in an organic solvent;
   providing a second uniform slurry of the organic solvent and a binder;
   drying the second slurry to form a spherical powder; and
   dry pressing and sintering the spherical powder to form the ceramic, wherein the basis material comprises alumina, the additive comprises strontium carbonate, and an oxygen-containing compound of strontium having a perovskite structure is obtainable by a reaction of the additive with at least one of the flexibilizer and the black stain during the sintering process,
   wherein the oxygen-containing compound of strontium comprises at least one of $Sr_aA_bO_c$ and $Sr_xE_yO_z$, where A represents at least one of tantalum and niobium; E represents at least one selected from a group consisting of cobalt, iron and manganese.

* * * * *

UNITED STATES PATENT AND TRADEMARK OFFICE
CERTIFICATE OF CORRECTION

PATENT NO. : 10,047,011 B2
APPLICATION NO. : 15/192721
DATED : August 14, 2018
INVENTOR(S) : Ge Chen et al.

Page 1 of 1

It is certified that error appears in the above-identified patent and that said Letters Patent is hereby corrected as shown below:

On the Title Page

Item (30), in the Foreign Application Priority Data:
"Dec. 30, 2013 (CN).............. 2013 1 0745369"
Should read:
--Dec. 30, 2013 (CN)............. 201310745369.0--

Signed and Sealed this
Eleventh Day of December, 2018

Andrei Iancu
*Director of the United States Patent and Trademark Office*